Patented Dec. 28, 1943

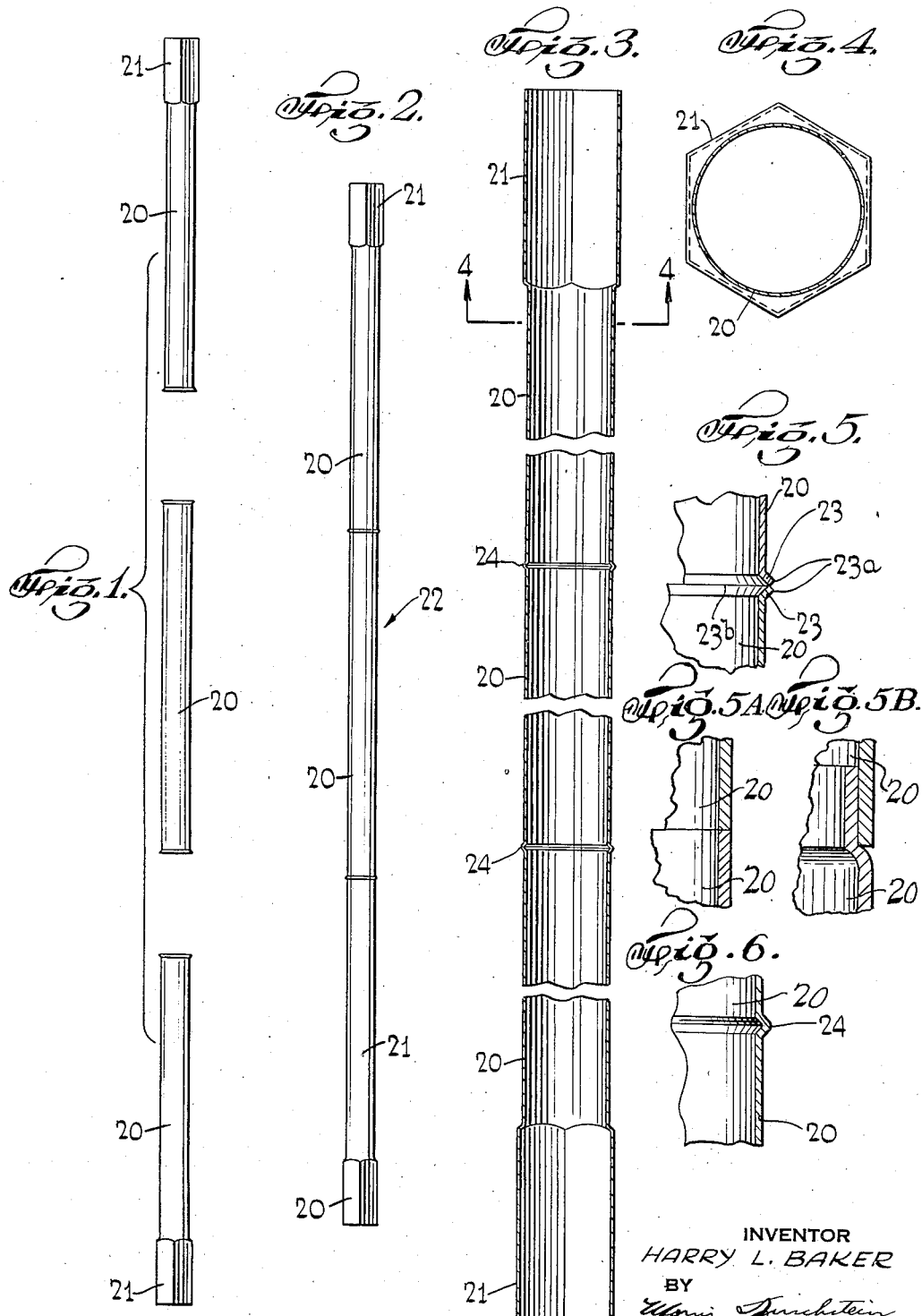

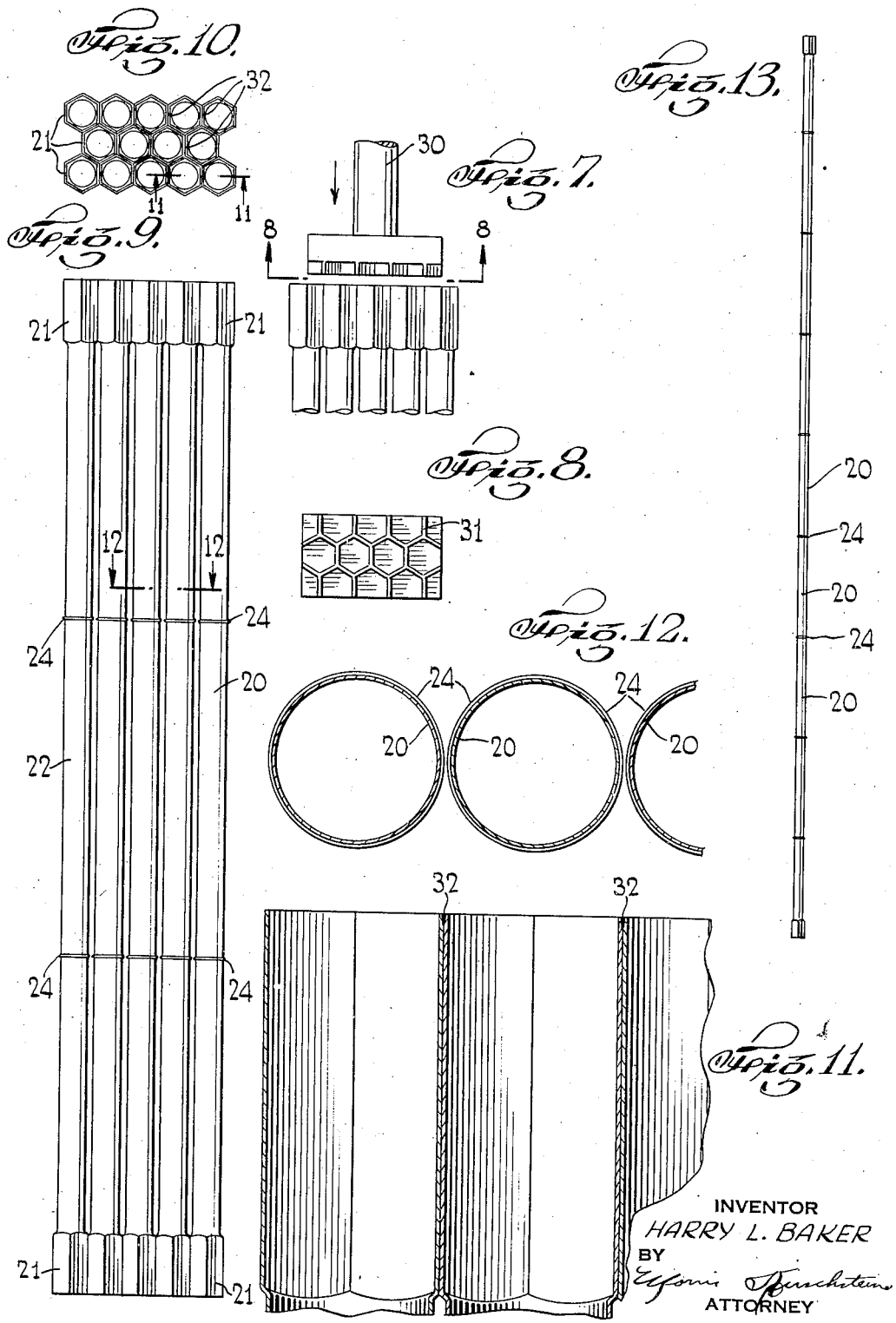

2,337,584

UNITED STATES PATENT OFFICE 2,337,584

HEAT EXCHANGE TUBE

Harry L. Baker, Miami, Fla., assignor of one-half to The Fred Goat Co., Inc., Brooklyn, N. Y., a corporation of New York Application September 25, 1940, Serial No. 358,316

4 Claims. (Cl. 138—47)

This invention relates to aircraft heat exchangers and radiator tubes, and to a method for making the same.

Heretofore aircraft radiation has comprised a plurality of assembled copper tubes of small diameter having enlarged hexagonal ends which provide interstices between the several tubes. Air is allowed to flow through the interior of the tubes, and the fluid to be cooled, which is lubricating oil or the cooling medium for liquid cooled engines, flows between and around the tubes.

As engine ratings rapidly increased to their present high horsepower, it became necessary to provide improved means for dissipating the increasingly larger amounts of heat generated. This was accomplished by reducing the wall thickness of the tubes and increasing the length and number of tubes in the radiator core. These changes have been carried out to the point where the tube is about six thousandths of an inch in wall thickness and about fourteen inches in length. However, even this proved to be insufficient and it became necessary to provide a plurality of cores for each engine.

Radiators built in the manner above described have been subject to many defects. Thus, the soldered or brazed joints employed in assembling the tubes weaken or fail under vibratory stresses. In addition, soldering or brazing the tubes causes annealing or softening of the individual tubes. Also, the tubes due to their extreme thinness of wall are very fragile and difficult to handle without distortion. The small wall thickness further has made it necessary to provide central supports where longer tubes, such as fourteen inch tubes, were employed, in order to prevent sagging.

One of the objects of my invention, therefore, is to provide a radiator tube and core which will overcome these defects and which, at the same time, shall be relatively economical to manufacture.

Another object of my invention is to provide a radiator tube which only flexes slightly and which is not susceptible to breakdown under the rapid vibrating stress sustained during operation.

Another object of my invention is to provide a novel means for joining the several radiator tubes to form an assembled radiator core.

In general, I accomplish these and other objects of my invention by employing a multiplicity of short tubular sections made from trimmed deep drawn cups of a metal having a high tensile and compressive strength and which lends itself to intersectional joining by means which may be effectively and practically employed in aircraft heat exchangers. The several sections are rigidly joined by suitable means, such as welding. The resultant radiator tube may be of substantial length and may have a wall thickness of even less than six thousandths of an inch.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which are shown various possible embodiments of this invention, Fig. 1 is a full scale view of a plurality of separate sections prior to assembly into a radiator tube embodying my invention;

Fig. 2 is a similar view showing the said sections after assembly into a nine inch three-section radiator tube;

Fig. 3 is an enlarged sectional view taken along the longitudinal axis of the radiator tube shown in Fig. 2;

Fig. 4 is an enlarged sectional view taken along the line 4—4 of Fig. 3;

Fig. 5 is a greatly enlarged detail view showing abutting end portions of two adjacent sections immediately prior to welding;

Figs. 5a and 5b are views similar to Fig. 5 but showing modified forms of my invention wherein the end portions are plain and telescoping respectively.

Fig. 6 is a view similar to Fig. 5 taken subsequent to welding;

Fig. 7 is a plan view of one end of a plurality of radiator tubes assembled preparatory to welding;

Fig. 8 is a view taken along the line 8—8 of Fig. 7;

Fig. 9 is a plan view of an assembled unit;

Fig. 10 is an end view of the unit shown in Fig. 9;

Fig. 11 is a cross-sectional view taken substantially along the line 11—11 of Fig. 10;

Fig. 12 is a sectional view taken substantially along the line 12—12 of Fig. 9; and Fig. 13 is a plan view of a nine-section radiator tube.

Referring now to the drawings, and more particularly to Fig. 1, I have shown a plurality of short, seamless tubular sections 20 formed from a tough, non-corrosive metal having a high tensile and compressive strength, such as for example stainless steel or Monel metal. These sections, in the embodiment herein illustrated, have an outside diameter of approximately one-quarter of an inch and a wall thickness of six thousandths of an inch and less. The sections are preferably short, being about two to three inches in length. However, I do not desire to confine myself to any specific length as tubular sections of about one inch to about six inches may be employed without departing from the spirit of my invention.

The length of section used is governed by the ultimate length of tube desired and by economical and structural considerations. Thus, a nine-inch radiator tube may be formed from three three-inch sections, as shown in Fig. 1, or from four shorter sections totalling nine inches in length. When a longer tube is to be fabricated, such as the twenty-seven inch tube shown in Fig. 13, nine three-inch sections may be employed, as shown in said figure. In the alternative, four six-inch sections may be used for the central portion of the tube and two shorter sections employed at the ends thereof. I prefer, however, to employ the shorter sections as a large number of sections results in a greater tube rigidity and provides better resistance to vibration or sagging.

The sections may be deep drawn in any manner well known to the art to form a tube of desired dimensions whose inner and outer surfaces are very smooth and to which additional strength has been imparted during fabrication. Due to the rigidity resulting from the method of manufacture and materials employed, long tubes such as the twenty-seven inch tube above mentioned may be used without the provision of any support intermediate its ends.

Also, as I form only relatively short sections, the wall metal is not unduly stressed during drawing and no incipient flaws are developed.

The end sections are provided in any suitable manner with the usual hexagonal tubular portions 21. Usually the distance between oppositely disposed parallel flats of the hexagons is approximately thirty thousandths of an inch greater than the outside diameter of the circular portion of the radiator tube, so that a clearance of about thirty thousandths of an inch is provided beween adjacently disposed outer walls of neighboring radiator tubes when assembled into a radiator core.

The several sections 20 are suitably joined, as for example by welding the sections together in end-to-end relationship to form a radiator tube 22 (Fig. 2). This welding step may be carried out in any manner known to the art, as by abutting the tubular sections 20 in end-to-end relationship (see Fig. 5a) and passing a welding current through the tubes. In order to increase the ease and accuracy of welding, the ends of the tubes may be specially shaped. Thus, for example, one end of each section may be slightly reduced in diameter and slipped within the unreduced end of the adjacent section (see Fig. 5b). Preferably, the ends of the sections 20 are formed as shown in Figs. 1 and 5 with a short peripheral flange 23 obtusely disposed relative to the side wall of the section, the outer edge 23a of the flange 23 being spaced a short distance, about fifteen thousandths of an inch, from the outer wall of the section.

When welding sections provided with the flanges 23, the sections are accurately aligned, a welding potential applied, and the sections are then brought together. The weld will begin at the inner edges 23b of the flanges 23 and as the sections 20 are moved closer together the edges 23a will fall into the weld. The ultimate welded joint formed is an annular external bead 24 (Fig. 6) whose greatest distance from the side of the tube 22 is less than half the space between adjacently disposed walls of neighboring assembled radiator tubes (Figs. 9 and 12). The welding operation is closely controlled in order to standardize the assembled length of the tube and the height of the welded joint 24, and to keep the welding time very short. This latter control enables the heat generated during welding to be localized and thus prevents annealing of the adjacent hardened wall portion of the sections 20, while at the same time providing a welded joint at least as strong as the hardened tubular section itself. The sections 20 may also be welded together by seam welding. In this method the ends of the sections 20 need not be specially shaped and are adjacently disposed with the sections in accurate alignment and with the portions to be welded beneath a welding rod. When welding is begun small globules of molten metal drop onto the sections of the joint while the sections are simultaneously rotated. In this manner a small external bead similar to the bead 24 is formed between the two sections.

After the individual radiator tubes 22 have been made they are assembled into a radiator core by stacking a plurality of tubes with the flats on the hexagonal ends 21 arranged in face-to-face relationship, as is well known in the art. In accordance with my invention, after the tubes have been arranged in the desired assembled position, the ends of the abutting hexagonal portions 21 are joined to each other by suitable means, such as for example, welding to form a light, strong, durable, and rigid joint therebetween. Such welding is preferably performed upon a small unit of from twelve to two hundred and fifty tubes, as shown in Figs. 7 through 10, after which the units are welded to each other to form a completed radiator core. Said core may comprise any desired number of tubes 22 and usually contains approximately ten thousand. The welding operation for forming the unit shown in Figs. 9 and 10 may be performed in any manner well known to the art, as for example by providing a welding head 30 having a plurality of ridges 31 pendant from its lower face and arranged in the shape of a honeycomb, which conforms in size and shape to the joints to be welded between the several hexagonal ends 21 of the radiator tubes 22. Said head 30 may be lowered into contact with the hexagonal portions 21 and a welding current momentarily passed therethrough which creates a weld 32 between the extreme end portions of abutting hexagonal flats. A larger welding head (not shown) provided with suitably formed welding ridges, may be employed to join the several units.

As by my invention relatively long radiator tubes such as the twenty-seven inch tube shown in Fig. 13 may be economically fabricated and safely used in a radiator core, I have greatly increased the ratio of radiation surface to frontal surface and thus appreciably reduced drag.

It will thus be seen that there is provided a device and method for making the same in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A built-up aircraft heat exchange tube comprising a plurality of tube sections welded together in end to end relation so as to form a built-up tube over 14 inches in length, said tube sections being from 1 inch to 6 inches in length and having a wall thickness of approximately .006 of an inch, the inner surface of the built-up tube being substantially free of obstructions.

2. A built-up aircraft heat exchange tube comprising a plurality of tube sections of non-corrosive metal welded together in end to end relation so as to form a built-up tube over 14 inches in length, said tube sections being from 1 inch to 6 inches in length and having a wall thickness of approximately .006 of an inch, the inner surface of the built-up tube being substantially free of obstructions.

3. A built-up aircraft heat exchange tube comprising a plurality of sections having flared out ends which are united by welding so as to leave an outwardly extending circumferential rib, said sections being from 1 inch to 6 inches in length and having a wall thickness of approximately .006 of an inch, the inner surface of the built-up tube being substantially free of obstructions.

4. A built-up aircraft heat exchange tube comprising a plurality of deep drawn tube sections welded together in end to end relation so as to form a built-up tube, the inner surface whereof is substantially free of obstructions, said tube sections being from 1 inch to 6 inches in length and having a wall thickness of approximately .006 of an inch.

HARRY L. BAKER.